(12) United States Patent
Köbe et al.

(10) Patent No.: US 8,326,480 B2
(45) Date of Patent: Dec. 4, 2012

(54) METHOD AND DEVICE FOR MONITORING THE STATE OF TIRES

(75) Inventors: Andreas Köbe, Bensheim (DE); Frank Schreiner, Friedrichsdorf (DE); Daniel Fischer, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 347 days.

(21) Appl. No.: 12/666,104

(22) PCT Filed: Apr. 25, 2008

(86) PCT No.: PCT/EP2008/055046
§ 371 (c)(1),
(2), (4) Date: Feb. 2, 2010

(87) PCT Pub. No.: WO2009/000573
PCT Pub. Date: Dec. 31, 2008

(65) Prior Publication Data
US 2010/0179718 A1  Jul. 15, 2010

(30) Foreign Application Priority Data
Jun. 28, 2007 (DE) .......................... 10 2007 029 870

(51) Int. Cl.
*G06F 7/00* (2006.01)
(52) U.S. Cl. .............. 701/29.1; 701/69; 701/72; 701/79; 701/80; 73/126; 73/146; 73/146.2; 73/146.5; 180/197; 180/248; 180/249; 340/442; 340/444; 702/140; 702/148; 188/29; 188/68
(58) Field of Classification Search .................. 701/29.1, 701/69, 72, 79, 80; 73/126, 146, 146.2, 146.5; 180/197, 248, 249; 280/11.204, 11.207; 702/140, 148; 188/29, 68
See application file for complete search history.

(56) References Cited

U.S. PATENT DOCUMENTS

| | | | | |
|---|---|---|---|---|
| 4,821,191 A * | 4/1989 | Ikemoto et al. | ................. | 701/38 |
| 4,844,557 A * | 7/1989 | Giers | ............................ | 303/140 |
| 5,583,483 A * | 12/1996 | Baumann | ...................... | 340/444 |
| 5,692,587 A * | 12/1997 | Fratini, Jr. | ................. | 188/266.2 |
| 5,907,097 A * | 5/1999 | Nakajima | .................... | 73/146.2 |
| 7,013,721 B2 * | 3/2006 | Keller et al. | .................... | 73/146 |
| 2005/0172709 A1 * | 8/2005 | Keller et al. | ................. | 73/146.3 |
| 2005/0274442 A1 * | 12/2005 | Huang et al. | .................. | 152/415 |

(Continued)

FOREIGN PATENT DOCUMENTS

DE     199 26 616 C2    12/2000

(Continued)

*Primary Examiner* — James Trammell
*Assistant Examiner* — McDieunel Marc
(74) *Attorney, Agent, or Firm* — RatnerPrestia

(57) ABSTRACT

Method for monitoring the state of a tire, in which at least one analysis value ($U^R{}_i$), from which the state of a tire is determined, is formed from wheel speed signals ($\omega^{rot}{}_i$) of the vehicle wheels, wherein the analysis value ($U^R{}_i$) is an absolute rolling circumference of a tire or a variable which represents the absolute rolling circumference of a tire, in particular a dynamic tire radius which is determined by evaluating wheel speed signals ($\omega^{rot}{}_i$) and signals from at least one sensor in order to measure the speed of the vehicle over an underlying surface, and the analysis value ($U^R{}_i$) is used to determine a loss of pressure and/or working loads of the tire, as well as a device for monitoring the state of the tire.

16 Claims, 2 Drawing Sheets

U.S. PATENT DOCUMENTS

2008/0223124 A1 9/2008 Irth et al.

FOREIGN PATENT DOCUMENTS

| DE | 100 58 140 A1 | 1/2002 |
| --- | --- | --- |
| DE | 10 2005 014 099 A1 | 10/2005 |
| DE | 10 2004 026 426 A1 | 12/2005 |
| DE | 10 2004 029 370 A1 | 1/2006 |
| DE | 10 2005 031 485 A1 | 2/2006 |
| DE | 10 2005 049 442 A1 | 4/2007 |
| DE | 10 2006 053 826 A1 | 6/2007 |
| EP | 1 336 513 A1 | 8/2003 |
| EP | 1 475 250 A1 | 11/2004 |
| EP | 1 777 083 A2 | 4/2007 |
| GB | 2 326 007 A | 12/1998 |
| WO | WO 01/87647 A1 | 11/2001 |

* cited by examiner

METHOD AND DEVICE FOR MONITORING THE STATE OF TIRES

CROSS REFERENCE TO RELATED APPLICATIONS

This application is the U.S. national phase application of PCT/EP2008/055046, filed Apr. 25, 2008, which claims priority to German Patent Application No. 10 2007 029 870.8, filed Jun. 28, 2007, the contents of such applications being incorporated by reference herein.

BACKGROUND OF THE INVENTION

1. Field of Invention

In modern motor vehicles, systems which contribute to active or passive protection of the vehicle occupants are being increasingly used. Systems for monitoring the tire pressure protect the vehicle occupants against injury which would otherwise be caused, for example, by an abnormal tire pressure. An abnormal tire pressure can, for example, increase the wear of the tire and the consumption of fuel, or a tire defect ("flat tire") may occur. Various tire pressure monitoring systems, which either operate on the basis of directly measuring sensors or detect an abnormal tire pressure by means of an evaluation of rotational speed properties or oscillation properties of the vehicle wheels, are already known.

2. Description of the Related Art

What are referred to as directly measuring tire pressure monitoring systems, which, by means of pressure sensors in the individual tires, sense the respective pressure in the respective wheel, are known, as described for example in application DE 199 26 616 C2. Furthermore, what are referred to as indirectly measuring tire pressure monitoring systems (DDS: Deflation Detection System), which can sense a pressure loss from auxiliary variables, for example by comparing the rolling circumferences of the individual wheels, are also known, for example from DE 100 58 140 A1.

WO 01/87647 A1 describes a tire pressure monitoring method and device which combine a tire pressure monitoring system which is based on the sensing of wheel radii and a tire pressure monitoring system which is based on the evaluation of oscillation properties.

Only relative changes in the rolling circumferences of up to three wheels compared to a learnt state can be detected with indirect tire pressure monitoring methods which are known from the prior art and which are based on the observation of rolling circumferences. The absolute rolling circumference of the tires is unknown in these indirect methods which are known from the prior art, since independent information about the vehicle speed is not available. For this reason, a simultaneous pressure loss at all four tires cannot be detected by these systems.

A method for determining the absolute rolling circumferences of the wheels of a motor vehicle from the wheel speed information is disclosed in DE 10 2005 014 099 A1. Here, the time difference between the occurrence of corresponding vibrations in the wheel speed signals at the front wheel and rear wheel of the same side of the vehicle is used to determine an absolute vehicle speed and the absolute rolling circumferences of the four wheels.

SUMMARY OF THE INVENTION

An objective of the invention is to make available a tire state monitoring system for a motor vehicle which is based on the evaluation of the rotational movement of the wheels and in which the reliability of the detection of, and issuing of warnings about, tire pressure losses and/or an excessive load/working load of the tire is increased.

The invention relates to the idea of evaluating wheel speed information and signals of a sensor for measuring the speed of the vehicle over an underlying surface in order to determine absolute tire rolling circumferences and therefore carry out improved tire monitoring.

According to aspects of the invention, as a generalization, the term "absolute tire rolling circumference" is also understood to mean any variable which represents the tire rolling circumference of a vehicle wheel, for example the tire radius.

The term "wheel speed" is understood according to aspects of the invention to mean, as a generalization, any variable which represents the wheel speed of a vehicle wheel. This can also be, for example, a wheel rotating time. Correspondingly, the term "wheel speed signal" is understood according to aspects of the invention to mean a signal which represents the wheel speed of a vehicle wheel.

A tire pressure loss and/or an excessive load or working load on the tire is preferably detected by virtue of the fact that a comparison of a currently determined absolute rolling circumference with at least one absolute rolling circumference comparison value is carried out. The difference is particularly preferably formed from the currently determined absolute rolling circumference and the rolling circumference comparison value. If said difference is greater than a predefined threshold value, a pressure loss of the tire and/or an excessive load on the tire is detected.

The sensor for measuring the speed of the vehicle over an underlying surface is preferably based on an optical measuring method or on a measuring method which is based on radar. For this purpose, the sensor is particularly preferably arranged on the vehicle. The sensor particularly preferably emits electromagnetic radiation which is reflected by the surface of the carriageway and/or other fixed objects. The speed of the vehicle over an underlying surface is quite particularly preferably determined by means of sensors for automatic inter-vehicle distance and/or speed control (ACC: Adaptive Cruise Control) or cameras for estimating speed.

According to one preferred embodiment of the method according to aspects of the invention, a vehicle longitudinal speed and/or a vehicle lateral speed are determined from the signals of the sensor for measuring the speed of the vehicle over an underlying surface. The absolute vehicle speeds at the wheel contact points are then particularly preferably determined from said vehicle longitudinal speed and/or vehicle lateral speed. In addition to the vehicle longitudinal speed and the vehicle lateral speed, the yaw rate is quite particularly preferably used for this purpose. The absolute vehicle speeds can therefore also be determined at the wheel contact points in the case of cornering.

It is preferred that the speed components are determined in the wheel longitudinal direction from the absolute vehicle speeds at the wheel contact points. Said speed components are then included in the calculation of the absolute rolling circumferences.

The toe-in angle or angles of the rear wheels and/or the wheel lock angle of the front wheels are preferably taken into account in order to determine the speed components in the wheel longitudinal direction. Sufficiently precise determination of the speed components in the wheel longitudinal direction is therefore possible. The wheel lock angle is particularly preferably determined by means of a sensor. A determination is therefore obtained which is as precise and reliable as possible. However, it is also particularly preferred that the wheel lock angle is determined from the steering wheel angle by means of a steering model. This avoids the cost of a wheel lock angle sensor.

The absolute rolling circumferences are preferably determined for each wheel so that it is possible to monitor each individual wheel.

According to one preferred embodiment of the method according to aspects of the invention, the absolute tire rolling circumferences are learnt if the learning process is initiated by the driver by activation of an activation element or of an activation function. The driver ensures that the correct tire pressures are set, and informs the monitoring system of this by initiation. The comparison values are then learnt.

Alternatively it is preferred that the absolute tire rolling circumferences are learnt in the method according to aspects of the invention if an automatic learning process is started by a second tire state monitoring system. As a result, the learning process becomes independent of the driver. The second tire monitoring system is particularly preferably a directly measuring tire pressure monitoring system which comprises at least one tire pressure sensor. By comparing the tire pressures measured using the pressure sensors with predefined threshold values, the second tire state monitoring system determines that the correct tire pressures for a learning process are present.

The comparison values of the absolute tire rolling circumferences are preferably predefined as a function of at least one of the following variables or learnt as a function of at least one of the following variables: speed, drive torque, yaw rate and lateral acceleration. Accordingly, the comparison of the currently determined absolute tire rolling circumference and the comparison value is carried out in the case of a value or values which is/are comparable in terms of the speed and/or drive torque and/or yaw rate and/or lateral acceleration. The learning and the monitoring (comparison) particularly preferably take place in value ranges or intervals of the speed and/or of the drive torque and/or of the lateral acceleration. As a result, the dependence of the rolling circumference on these variables is taken into account with limited expenditure on computing and storage.

The method according to aspects of the invention is preferably carried out in an indirectly and/or directly measuring tire pressure monitoring system. This permits mutual plausibility-checking of the results of the various methods. This gives rise to a more reliable warning about a pressure loss and to fewer incorrect warnings.

An advantage of the invention is the detection of a pressure loss in all four tires at the same time.

BRIEF DESCRIPTION OF THE DRAWINGS

Further preferred embodiments emerge from the following description of an exemplary embodiment with reference to Figures, of which.

DETAILED DESCRIPTION OF THE PREFERRED EMBODIMENTS

Figure 1:
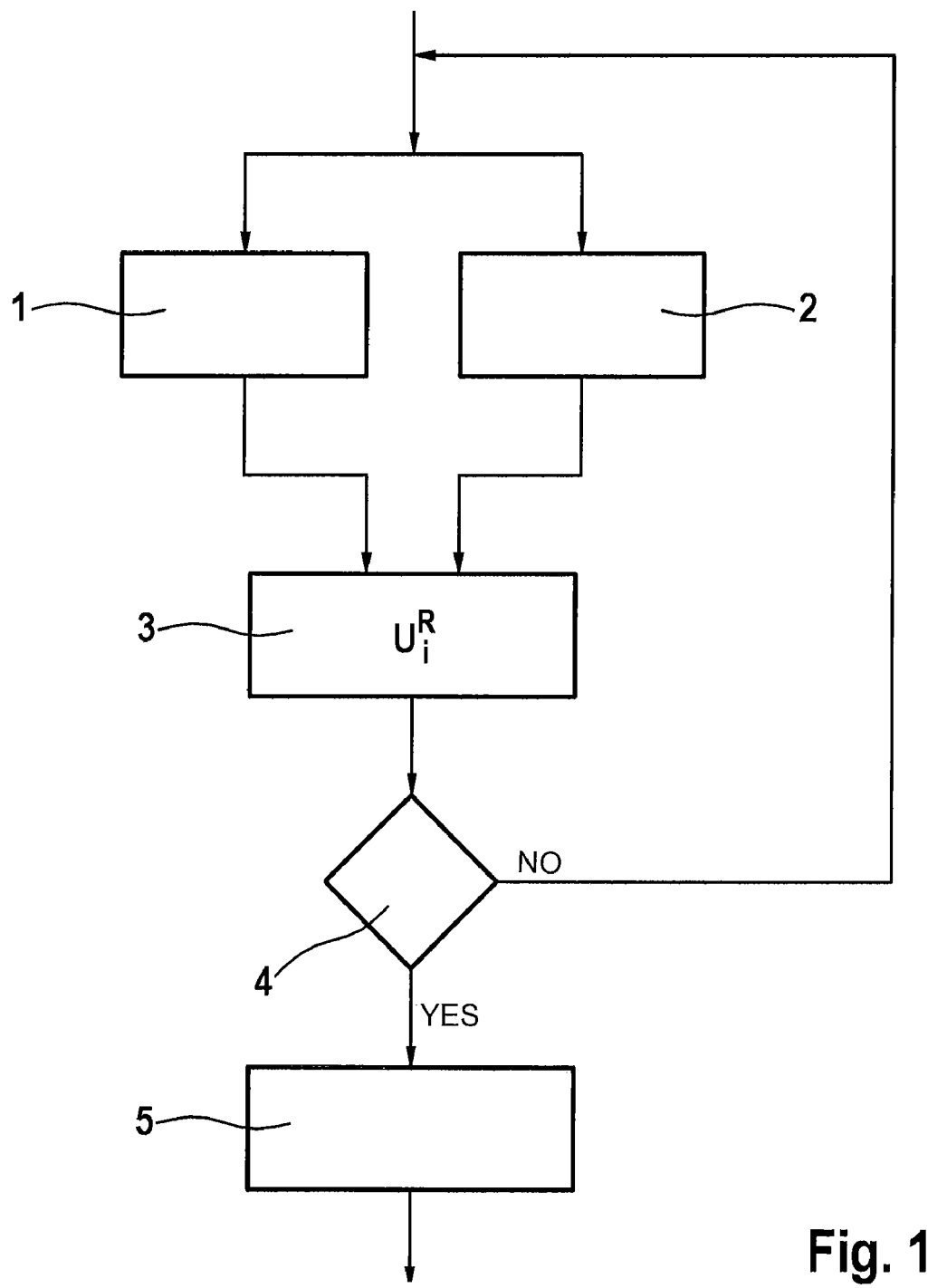
FIG. 1 is a schematic block circuit diagram of an exemplary method.

FIG. 1 illustrates a schematic block circuit diagram of an exemplary embodiment of a method according to aspects of the invention. In block 1, the wheel speeds of the wheels are determined. The present invention uses the information of a sensor which determines the absolute speed of the vehicle (block 2). With such sensors, the information about the vehicle longitudinal speed $v^F_x$ and vehicle lateral speed $v^F_y$ is usually available. These variables are used to determine the absolute rolling circumferences $U^R_i$ of the tires (block 3), which absolute rolling circumferences $U^R_i$ are used for the monitoring of the tire pressure (block 5).

The index i stands for a wheel (i=VR (front right), i=VL (front left), i=HR (rear right), and i=HL (rear left)).

Figure 2:
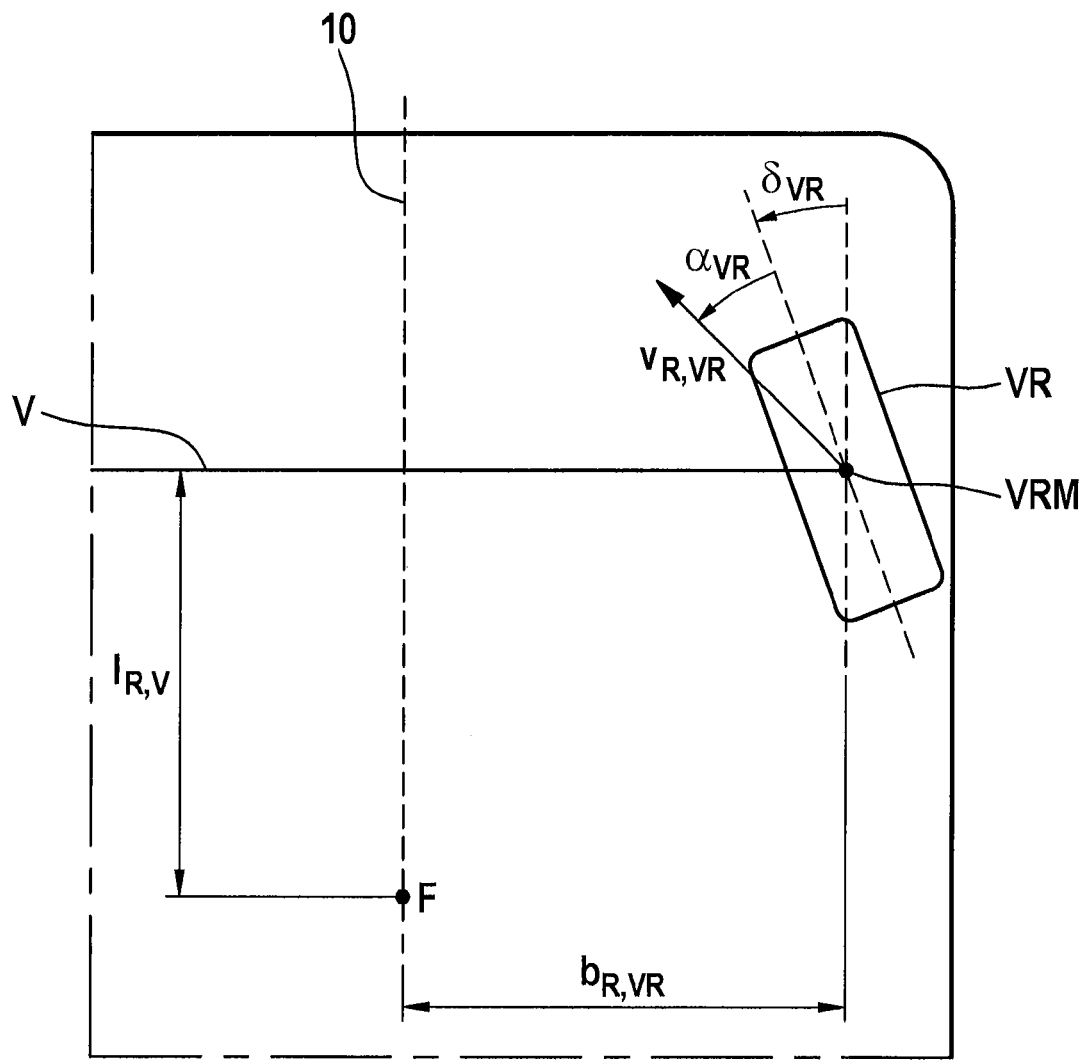
FIG. 2 is a schematic view of the relationship between individual variables.

In order to determine the absolute rolling circumferences $U^R_i$, the absolute vehicle speeds are first determined at the wheel contact points $v^R_i$. In the case of straight-ahead travel, the vehicle speeds at the wheel contact points are equal to the vehicle longitudinal speed ($v^R_i = v^F_x$). In the case of cornering, the vehicle speeds at the wheel contact points $v^R_i$ can be calculated from the vehicle longitudinal speed $v^F_x$ and vehicle lateral speed $v^F_y$ taking into account the yaw rate $\psi$:

$$v^R_{i,x} = v^F_x + \psi \cdot l_i$$

$$v^R_{i,y} = v^F_y - \psi \cdot b_i$$

$$v^R_i = \sqrt{(v^R_{i,x})^2 + (v^R_{i,y})^2}$$

where (see also the example of the front wheel VR in FIG. 2)
$l_i$: (perpendicular) distance $l_{R,V}$ and $l_{R,H}$ between the center of gravity of the vehicle F and the front axle V or rear axle H ($l_i = l_{R,V}, l_{R,V}, -l_{R,H}, -l_{R,H}$ for i=VL, VR, HL, HR)
and
$b_i$: (vertical) distance between the vehicle longitudinal axis 10 and the wheel centerpoint VRM ($b_i = b_{R,VL}, -b_{R,VR}, b_{R,HL}, -b_{R,HR}$ for i=VL, VR, HL, HR).

Depending on the driving situation, the speed at the wheel contact points does not point in the longitudinal direction of the wheel. The angle between these directions is referred to as the tire slip angle $\alpha_i$. The wheel lock angle $\delta_i$ can be used to calculate the tire slip angle $\alpha_i$:

$$a_i = \delta_i - \arctan \frac{v^R_{i,y}}{v^R_{i,x}}$$

The wheel lock angle $\delta_i$ contains, for example, the toe-in angle at the rear axle and/or the wheel lock angle at the front axle. The wheel lock angle at the front axle can be determined from the steering wheel angle and a steering model if there is no sensor present.

The speed component in the wheel longitudinal direction is subsequently calculated using $v^R_i \cdot \cos \alpha_i$ from the absolute vehicle speeds at the wheel contact points.

The absolute rolling circumferences are obtained from $$U^R_i = \frac{v^R_i \cdot \cos \alpha_i}{\omega^{dreh}_i}$$

where $\omega^{dreh}_i$ is the rotational frequency of the wheel i, which is determined, for example, using an ABS (anti-lock brake system) rotational speed sensor. The absolute rolling circumferences $U^R_i$ are preferably used for monitoring the tire pressure. For this purpose, in a method for detecting pressure losses at the tire, the rolling circumferences which are determined according to the above method are firstly learnt (interrogation 4 in FIG. 1: learning process concluded?) and then stored ($U^{R,lern}_i$). This requires the driver to indicate, for example by pressing a pushbutton key, the presence of a satisfactory tire pressure to the system for monitoring tire pressure or to the method. After learning is completed (YES in interrogation 4 in FIG. 1), continuous monitoring (block 5) is carried out by comparing the current rolling circumferences $U^{R,akt}_i$ with the learnt values $U^{R,lern}_i$. If the difference $U^{R,lern}_i - U^{R,akt}_i$ exceeds a threshold value, there is an indication of a pressure loss.

The rolling circumferences $U^R_i$ of the tires depend essentially on the speed, the drive torque, the lateral forces and the wheel load. In particular, the rolling circumferences $U^R_i$ of the driven wheels depend greatly on the slip which is determined essentially by the braking torque $M_{Brems}$ and the engine torque $M_{Antrieb}$ which are present. The following relationship applies to the rolling circumferences $U^R_i$:

$$U^R_i = \frac{V^R_i \cdot \cos\alpha_i}{\omega^{dreh}_i} = \frac{V^R_i \cdot \cos\alpha_i}{\omega^{dreh}_{0i} + \Delta\omega^{dreh}_i}$$

where $\omega^{dreh}_0{}_i$ results from an ideal rolling movement and $\Delta\omega^{dreh}_i$ represents the slip-dependent component of the wheel speed. For a tire pressure monitoring means, $\Delta\omega^{dreh}_i$ therefore represents a fault.

In order to achieve the precision and robustness which are required for monitoring pressure in practice, it is therefore necessary to limit the learning and the detection/monitoring to driving situations with low slip (for example restriction to straight-ahead travel) or to take into account and/or compensate the influence described above.

The influence can be taken into account by the learning and detection/monitoring in braking torque ranges and/or engine torque ranges or by a continuous correction.

In the case of learning and detection/monitoring in, for example, braking torque ranges and/or engine torque ranges, the difference $U^{R,lern}_i - U^{R,akt}_i$ is determined with the learning value $U^{R,lern}_i$, associated with the current measurement value $U^{R,akt}_i$, for the same values of the braking torque and/or engine torque.

In the case of continuous correction, a relationship f between the rolling circumference $U^R_i$ and the braking torque $M_{Brems}$ and/or engine torque $M_{Antrieb}$:

$$U^R_i = f(M_{Brems}, M_{Antrieb})$$

is learnt in the form of a characteristic curve. For the purpose of detection/monitoring, the currently acquired wheel circumference $U^{R,akt}_i$ is then reduced by this proportion f in order to obtain the corrected rolling circumference $U^{R,korr}_i$:

$$U^{R,korr}_i = U^{R,akt}_i - f(M_{Brems}, M_{Antrieb})$$

A corresponding procedure can additionally or alternatively be carried out for other influences such as speed, lateral acceleration, yaw rate, load and/or lateral forces.

If the dependence on the load is not explicitly taken into account during the learning process or if no correction of the wheel circumferences with respect to the load is carried out (see description above), the reset should be carried out only in the case of partial load in order to compensate as far as possible for the influence of the load. A later increase in load then gives rise to smaller rolling circumferences, about which warnings may possibly already have to be given owing to the greater loading of the tires.

According to one exemplary embodiment, the method according to aspects of the invention is applied in combination with a DDS, and serves predominantly here for the detection of a simultaneous pressure loss at all four wheels. Compared to application of the DDS method alone, this also provides the advantage that a warning is given of loading on the tire which is too high overall, and it can therefore be avoided, irrespective of whether it has been caused by pressure loss or an increase in wheel load.

According to another exemplary embodiment, the method according to aspects of the invention is to be used in combination with a directly measuring tire pressure monitoring system. In this case, the indication of the correct pressures by means of a pushbutton key (reset by the driver when correct pressures are present) can also be dispensed with, and an internal signal can be passed on by the direct system (TPMS: tire pressure monitoring system) (automatic resetting in the case of the method according to aspects of the invention). It is therefore possible to monitor the plausibility of the TPMS information, and there is therefore redundant pressure information present which permits, for example, the tire pressure also to be used as an input variable for safety-related vehicle control systems such as ABS (anti-lock brake system) and/or ESP (electronic stability program).

Advantages of the method according to aspects of the invention over the prior art are:

detection of a simultaneous pressure loss at all four tires, and extension of the working range for cornering.

Various measurement methods are possible for the sensor for determining the absolute vehicle speed. Sensors for determining the absolute vehicle speed are generally based on optical systems which sense the reflection or the image of the roadway with an optical sensor. For this purpose, the roadway is irradiated with a specific optical signal or a light source. The evaluation of these signals is usually based on the principle of optical correlation or of optical flux.

The invention claimed is:

1. A method for monitoring a state of a tire of a vehicle by a processor comprising the steps of:

establishing by the processor at least one analysis value ($U^R_i$), from which a tire state is inferred, from wheel speed signals ($\omega^{dreh}_i$) of wheels of the vehicle, wherein the analysis value ($U^R_i$) is an absolute rolling circumference of a tire or a variable which represents the absolute rolling circumference of a tire which is determined by an evaluation of wheel speed signals ($\omega^{dreh}_i$) and signals from at least one sensor for measuring a speed of the vehicle over an underlying surface; and inferring a pressure loss, a load on the tire and/or a working load on the tire from the analysis value ($U^R_i$).

2. The method as claimed in claim 1, wherein the pressure loss, the load on the tire and/or the working load on the tire are inferred from a comparison of a currently determined analysis value ($U^{R,akt}_i$) with at least one analysis comparison value ($U^{R,lern}_i$).

3. The method as claimed in claim 2, wherein the analysis comparison value ($U^{R,lern}_i$) is learnt if a learning process is initiated by a driver by activation of an activation element or of an activation function, or if an automatic learning process is started by a second tire state monitoring system.

4. The method as claimed in claim 2, wherein the second tire state monitoring system is a direct tire pressure monitoring system with at least one tire pressure sensor.

5. The method as claimed in claim 2, wherein analysis comparison values ($U^{R,lern}_i$) are predefined or learnt as a function of at least one of the following travel state variables: vehicle speed, braking torque, drive torque, yaw rate, load, lateral forces and lateral acceleration, and wherein a comparison of the currently determined analysis value ($U^{R,akt}_i$) and the analysis comparison value ($U^{R,lern}_i$) is carried out in a case of a value or values which is/are comparable in terms of travel state variable or variables.

6. The method as claimed in claim 2, wherein analysis comparison values ($U^{R,lern}_i$) and/or currently determined analysis values ($U^{R,akt}_i$) are corrected in terms of their dependence on at least one of the following travel state variables: vehicle speed, braking torque, drive torque, yaw rate, load, lateral forces and lateral acceleration.

7. The method as claimed in claim 6, wherein, in order to correct analysis comparison values ($U^{R,lern}_i$) and/or currently determined analysis values ($U^{R,akt}_i$) at least one functional relationship (f) between the analysis comparison value and/or analysis value ($U^{R,lern}_i$, $U^{R,akt}_i$) and the travel state variable or variables is learnt.

8. The method as claimed in claim 1, wherein a vehicle longitudinal speed ($v^F_x$) and/or a vehicle lateral speed ($v^F_y$) are determined from signals of the sensor for measuring the speed of the vehicle over an underlying surface.

9. The method as claimed in claim 1, wherein absolute vehicle speeds at wheel contact points ($v^R_i$) and/or speed components in a wheel longitudinal direction are determined from the signals of the sensor for measuring the speed of the vehicle over an underlying surface for each wheel.

10. The method as claimed in claim 9, wherein a yaw rate ($\Psi$) is taken into account during a determination of the absolute vehicle speeds at the wheel contact points ($v^R_i$).

11. The method as claimed in claim 9, wherein a toe-in angle and/or a wheel lock angle ($\delta_i$) are/is taken into account during the determination of the speed components in the wheel longitudinal direction ($v^R_i$).

12. The method as claimed in claim 1, wherein said method is carried out in an indirectly measuring and/or directly measuring tire pressure monitoring system.

13. The method according to claim 1, wherein information which is acquired from the analysis values ($U^R_i$) is used to control a braking pressure in an electronic vehicle control system.

14. The method according to claim 13, wherein the electronic vehicle control system is either an anti-lock brake system (ABS) or an electronic stability program (ESP).

15. The method according to claim 1, wherein the variable which represents the absolute rolling circumference of a tire is a dynamic tire radius.

16. A device for monitoring a state of a tire which is arranged on a vehicle, having sensors for determining wheel speed signals of wheels of the vehicle and at least one sensor for measuring a speed of the vehicle over an underlying surface,
wherein said device comprises an analysis unit in which an absolute rolling circumference ($U^R_i$) of a tire or a variable which represents the absolute rolling circumference of a tire is determined by an evaluation of wheel speed signals ($\omega^{dreh}_i$) and of signals of the sensor for measuring the speed of the vehicle over an underlying surface, by means of which rolling circumference ($U^R_i$) or variable the tire is monitored for a pressure loss, a load of the tire and/or a working load of the tire.

* * * * *